Patented Aug. 5, 1941

2,251,550

UNITED STATES PATENT OFFICE 2,251,550

ART OF PRODUCING WAX MODIFYING AGENTS

Eugene Lieber, Linden, N. J., assignor to Standard Oil Development Company, a corporation of Delaware No Drawing. Application December 7, 1937, Serial No. 178,530

6 Claims. (Cl. 252—55)

The present invention relates to the art of producing wax modifying agents which may be employed for reducing the pour point of waxy lubricating oils, or in connection with processes for dewaxing oils containing paraffin wax, or in any other process or composition in which a wax structure is to be modified by reducing the crystal size. The invention will be fully understood from the following description.

Wax modifying agents are now known in the art and are produced from various raw materials. For example, the most widely used material is produced by condensation of paraffin wax with an aromatic compound such as naphthalene. Other materials can be used; for example, fatty acid halides may be condensed with aromatic hydrocarbons to produce ketonic condensation products which are likewise useful for this purpose. It has now been found that superior wax modifying agents may be produced from fatty acid halides without the use of aromatic compounds. The exact structure of these materials is not fully understood, but it is believed that they are poly-ketones. They are clearly distinguished from the ketonic materials mentioned above because they do not contain aromatic groups. The nature of the materials and the method of manufacture will be described in detail below.

In producing the present products, acid halides containing hydrocarbon chains of at least ten carbon atoms are used as the raw material. Naturally occurring fatty acids such as stearic, oleic, palmitic and the like may be employed, either alone or in mixtures, but such materials are relatively expensive and it has been found that acids produced by the oxidation of paraffin wax are cheaper and even more effective. These materials consist of mixtures of waxy acids having from 10 to 20 carbon atoms in the chain, and such a mixture can be used advantageously. If desired, however, narrower cut fractions may be employed, for example, having from 10 to 14 carbon atoms or 13 to 16 carbon atoms. Thus if it is desired to utilize a certain fraction of the acids for some other purpose, the remaining acids may be used for present purposes.

The first step in the process is to convert the fatty acid, or mixture of fatty acids, into acid halides and this may be accomplished by any known process. For example, the acid may be reacted with phosphorus trichloride. The reaction occurs smoothly at about the temperature of boiling water and the acid chloride forms an oily layer on top of the aqueous phosphorus acid and may be decanted therefrom.

The acid halide, preferably acid chloride, is then polymerized by gently heating to a temperature from say 400 to 750° F., care being taken to hold the temperature below that at which carbonization occurs. The heating is carried out for several hours until the evolution of hydrogen chloride has practically ceased. The nature of the reaction is not fully understood, but it is obvious that the hydrogen halide is split from the acid halide, and it is believed that the formation of a high molecular weight ketone occurs which probably immediately begins to polymerize. Thickening is noted during the heating period and heating may be continued after all of the hydrogen chloride has been evolved in order to effect further polymerization. Catalysts are not necessary for the process, but it is desirable to conduct the reaction under a condenser so that if the relatively heavy materials tend to vaporize, they will be returned for further reaction.

After polymerization, the product is preferably diluted with a suitable solvent, such as alcohol, kerosene or the like, and it is washed free from acid. The solvent is then removed by distillation and the wax modifying agent is collected as a distillation residue. The distillation is preferably carried out under vacuum to a temperature of say 500° F., in order to remove low boiling materials. The final product is a viscous, gummy material of good color and freely soluble in mineral oils.

This product may be used as such or may be further purified by hydrogenation, acid treatment or the like. When used as a pour depressant, it is employed in quantities from say 0.1 to 5%, although usually 1% is sufficient for most purposes. It will be understood that different oils require slightly different amounts of the material for a given pour depression, and likewise materials made up from different types of acids vary somewhat in their pour depressing strength.

These modifying agents may be used in connection with processes for dewaxing hydrocarbon oils and then added either to the oil to be dewaxed, or to the oil after it has been diluted with naphtha, or with other suitable dewaxing solvents. The mixture is chilled to the wax separating point and the actual separation may be conducted either by filtration, sedimentation or centrifugation. In any case, it will be found that the presence of a relatively small amount of the material, say 1% more or less, will considerably increase the ease with which the separation is accomplished and increase the rate at which chilling may be carried out.

As examples of the present method for producing pour point depressants, the following experiments may be considered:

Example I 100 grams of fatty acids, produced by the oxidation of paraffin wax with air at a temperature from 100 to 125° C., were mixed with 30 grams of phosphorus trichloride. The mixture was allowed to stand on a water bath until a layer of the fatty acid chloride was formed on top of the aqueous layer. This material was then drawn off and heated in a flask for two hours at a temperature of 575° F., under an air condenser. During the heating, dense fumes of hydrogen chloride were evolved and the material in the flask was found to be gradually thickening. At the end of the two hour period, the amount of hydrogen chloride evolved had gradually decreased and on continuing for one-half hour longer, evolution of the hydrogen chloride had practically ceased. The heating was then discontinued and the product was then diluted with ether and this solution was washed free from acid.

The ether was removed by distillation and a crude product amounting to 93 grams was recovered. This was then distilled under vacuum, at 5 mm. mercury pressure, to a temperature of 500° F. A portion of the lower boiling material was removed and the distillation residue amounting to 65 grams was recovered. This product was a viscous, gummy oil, freely soluble in mineral lubricating oil.

In order to test the pour depressing power of this material, 1% thereof was added to a waxy oil which originally had a pour point of 30° F. It was found that the pour point of the blended product was depressed to slightly below —30° F.

Example II 100 grams of stearic acid was converted to stearyl chloride by treatment with 30 grams of phosphorus trichloride in the same manner described for the wax-acids in Example No. I. The stearyl chloride was drawn off and heated in a flask to 575° F. It was found in this case that a much longer period of heating was required before the evolution of hydrogen chloride had practically ceased, namely 5 hours. The heating was then discontinued and the product recovered as described in Example No. I, 55 grams of vacuum distillation residue being obtained. 1% of this material added to the same waxy oil, of Example No. I, depressed the pour point to —20° F.

The polymerization products per se and the method of preparing same are claimed in copending application, Serial No. 371,993, filed December 27, 1940.

The present invention is not to be limited by any theory of the mechanism of the process nor to the use of any particular fatty acid or mixture thereof, but only to the following claims in which it is desired to claim all novelty inherent in the invention.

I claim:

1. An improved composition of matter comprising a waxy lubricating oil and a small amount of a pour depressing compound, prepared by subjecting a mono basic fatty acid chloride having a chain of at least 10 carbon atoms to the action of heat at a temperature of about 575° F., whereby hydrogen halide is evolved and the organic residue is polymerized, and continuing the heating at said temperature until substantially all of the halide has been removed.

2. An improved composition of matter comprising a waxy lubricating oil and a small amount of a pour depressing compound prepared by subjecting an aliphatic monobasic saturated fatty acid chloride having at least 10 carbon atoms in the molecule to the action of heat at a temperature between 400° and 750° F. whereby hydrogen chloride is evolved and the organic residue is polymerized and continuing the heating at said temperature until substantially all of the halide has been removed.

3. An improved composition of matter comprising a waxy lubricating oil and a small amount of a pour depressing compound prepared by subjecting a monobasic fatty acid halide having a chain of at least 10 carbon atoms in the absence of a condensing catalyst to the action of heat at a temperature between 400° and 750° F. whereby hydrogen halide is evolved and the organic residue is polymerized and continuing the heating at said temperature until substantially all of the halide has been removed.

4. An improved composition of matter comprising a waxy lubricating oil and a small amount of a pour depressing compound prepared by subjecting a material consisting of a monobasic fatty acid chloride having at least 10 carbon atoms in the molecule to the action of heat at a temperature between 400° and 750° F. whereby hydrogen halide is evolved and the organic residue is polymerized and continuing the heating at said temperature until substantially all of the chloride has been removed.

5. A composition of matter comprising a major proportion of waxy mineral lubricating oil and a small amount of a pour-depressing compound prepared by subjecting the chloride of fatty acids having a chain of at least 10 carbon atoms and produced by the oxidation of paraffine wax, to the action of heat at a temperature of about 575° F. for about two hours under an air condenser, whereby hydrogen chloride is evolved and the organic residue is polymerized, and continuing the heating at said temperature until substantially all of the hydrogen chloride has been removed, removing free acids from the products and distilling the polymerization product under vacuum at about 5 mm. mercury pressure to a temperature of about 500° F., whereby a residue consisting of a viscous gummy oil freely soluble in mineral lubricating oil is obtained.

6. Composition according to claim 2 in which the pour-depressing compound is prepared by heating stearyl chloride.

EUGENE LIEBER.